Aug. 9, 1966  W. LEHMER  3,265,898
RADIATION-SHIELDING SYSTEM FOR WALL-PENETRATING PIPES
Filed Dec. 18, 1962
2 Sheets-Sheet 1
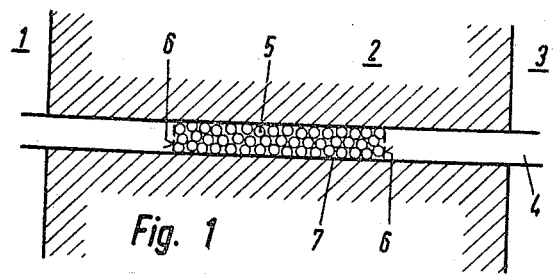
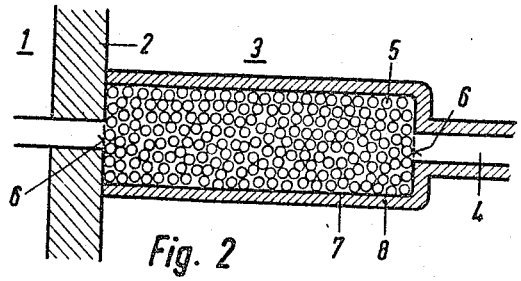
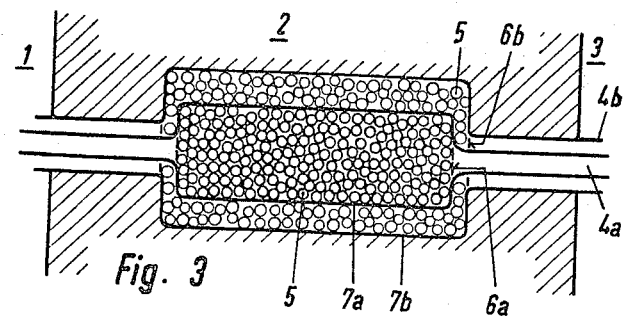
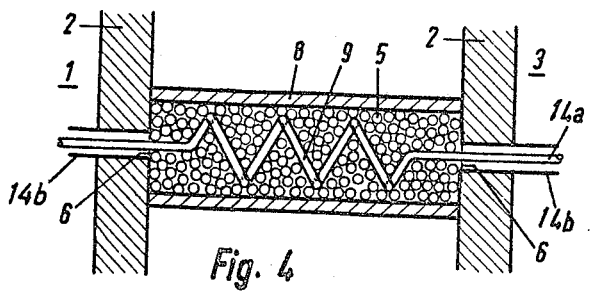
Inventor
WILHELM LEHMER
By Toulmin & Toulmin
Attorneys Aug. 9, 1966  W. LEHMER  3,265,898
RADIATION-SHIELDING SYSTEM FOR WALL-PENETRATING PIPES
Filed Dec. 18, 1962  2 Sheets-Sheet 2

Inventor
WILHELM LEHMER
By Toulmin & Toulmin
Attorneys

United States Patent Office 3,265,898
Patented August 9, 1966

3,265,898
RADIATION-SHIELDING SYSTEM FOR WALL-PENETRATING PIPES
Wilhelm Lehmer, Munich, Germany, assignor to Linde Aktiengesellschaft
Filed Dec. 18, 1962, Ser. No. 245,457
Claims priority, application Germany, Jan. 4, 1962, G 33,944
4 Claims. (Cl. 250—108)

The present invention relates to a protective radiation shielding arrangement for pipe lines passing from a room contaminated by radioactivity or other nuclear radiation, to an uncontaminated area.

Contaminated rooms as they exist in nuclear reactors, laboratories for isotopes, etc., are usually separated from the uncontaminated environment by means of strongly radiation absorbing walls. In many instances, e.g., in atomic reactors, it is necessary to have pipe lines running through these protective walls; through these pipes, fluids flow to serve, for example, as heat exchanger or reactor-protective mediums. Such pipe lines constitute "radiation channels," the shielding of which determines as the "weakest link" the effectiveness of the entire protective shielding around the contaminated room. The radiation may pass through the pipe line in axial direction either directly or indirectly (i.e. by way of a plurality of successive scattering processes). It is inherent in their nature that such pipe lines constitute radiation channels.

In order to reduce the amount of radiation passing through such pipe lines it is known to bend the pipes so that there is no linear passage through the wall. However, scattering will still permit passage of radiation. As a result, the shielding is insufficient in many instances, and the danger increases with an increased density of nuclear radiation and radioactivity in the contaminated room.

It is an object of the invention to provide a system for pipe line passage through a wall from a contaminated room into an uncontaminated area preventing passage of radiation therethrough to such an extent as is attainable with the uninterrupted wall. Throughout the specification, the term "contaminated room" is used to identify an enclosure or the like in which there is strong radioactivity or other nuclear radiation including both, particle rays and gamma rays; "uncontaminated area" is to mean the environment of such contaminated room, to be kept free from nuclear radiation and radioactivity, usually because personnel will be found in such area.

According to one aspect of the present invention, the system comprises a radiation-absorbing wall having a throughgoing pipe or pipe line system. In such a pipe there is provided a compartment filled with small, radiation-absorbent bodies, for example, lead balls. This compartment may simply be defined by two axially spaced, perforated retaining means for keeping the bodies in-between. Preferably this section is further defined by a pipe portion of larger diameter by comparison with that of the remaining pipe line.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawings in which:

FIG. 1 is a cross-section through a wall portion of a first system, according to the invention, separating a contaminated room from a uncontaminated area;

FIG. 2 is a similar view of an improved embodiment with a smaller separating wall with the pipe filling being outside thereof;

FIG. 3 is a cross-sectional view through a separating wall having a throughgoing coaxial twin pipe line;

FIG. 4 is a cross-sectional view showing a double wall with a coaxial pipe line system and interposed improved radiation absorbing means;

Figure 5:
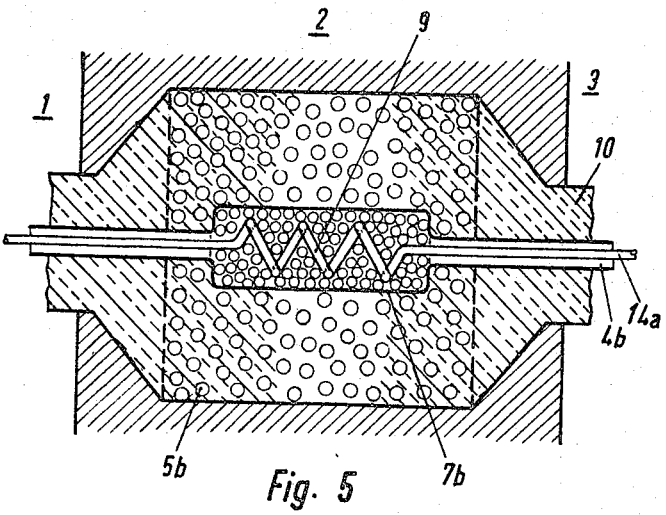
FIG. 5 is another cross-sectional view through a wall with heat insulation and a pipe line system passed therethrough, including a further improved radiation-absorbing arrangement.

Proceeding now to the detailed description of the drawings, in all figures the uncontaminated area is designated by the reference numeral 1 and is to be protected from nuclear radiation or radioactivity from a contaminated area or room 3 within the meaning as afore-described. The two rooms or areas 1 and 3 are basically and primarily separated by a wall 2 made of or including nuclear-radiation-absorbing material (e.g. concrete, lead plates).

In FIG. 1 there is shown the simplest way of practicing the invention. The wall 2 receives a throughgoing straight pipe line 4. The central region or a central compartment 7 of pipe line 4 is filled with a large number of filling bodies 5. These bodies 5 consist of radiation-absorbing material, for example, lead. German Patents 1,056,632 and 1,063,189 describe such lead balls which can be used as the filling bodies 5. The lead balls, i.e. bodies of round configuration, are preferably employed, since they offer least resistance to the fluid passing through the pipe, but basically it is possible to employ a nuclear-radiation absorbent of any coarse granular structure.

The lead balls will preferably have a diameter which is smaller approximately by one order of magnitude, preferably by one-third to one-tenth than the diameter of pipe line 4. The packing thus defines a large number of fluid passageways winding around the individual balls, none of them straight.

The filling bodies 5 are retained in compartment 7 by means of perforated members 6 which may be meshes or screens, thus also permitting the passage of fluid while preventing the balls from escaping. The perforations, of course, are smaller than the balls. Pipe section 7 is, in fact, defined by the two axially offset retainer means 6.

As can be seen from FIG. 1 the balls increase the flow resistance for a fluid passing through pipe line 4. It is, therefore, of advantage to enlarge the diameter of the pipe in the region containing the filling bodies. An example of such an arrangement is shown in FIG. 2. Here the compartment 7 of pipe line 4 containing the balls 5 is enlarged as far as the pipe diameter is concerned. It has been found of advantage to enlarge the diameter of section 7 as compared with the remainder of pipe line 4 by a factor of $\sqrt{3}$. The length of section 7 is preferably 0.5 meter. In this particular embodiment of the invention, it is also shown that the invention is not restricted to the employment of a very thick wall having pipe section 7 embedded therein as is the case in the system of FIG. 1; on the contrary, the pipe section containing the radiation absorbing bodies can be an outer attachment to the wall. In FIG. 2, wall 2 may consist of nuclear radiation absorbing material.

In order to avoid an increase of the radiation intensity by way of scattering in the pipe line, it is of advantage to envelop the pipe line by a nuclear-radiation-absorbing mantle or sleeve 8. This is particularly important for the pipeline section 7 containing the lead balls or the like. Of course, in this embodiment there is also provided the retaining means 6.

In atomic reactors it is often required to employ coaxial or concentric twin pipe lines. One of the pipe lines, for example the inner one, discharges from the contaminated reactor room slightly radioactive gas which is run through a cleaning device and the cleaned or purified gas passes through the outer pipe line back into the reactor room. The invention permits in a very advantageous manner the prevention of radioactive radiation from escaping into the uncontaminated area.

A first example of this type of protection is shown in FIG. 3. There is disclosed a coaxial, twin pipe system comprised of an inner pipe 4a and outer pipe 4b. The outer pipe 4b is provided with a section 7b of relatively large diameter as compared with the remainder of pipe 4b. The inner pipe 4a is likewise provided with an enlarged section 7a which is disposed inside the enlarged section 7b, but is of correspondingly shorter diameter as well as smaller axial length.

The annular space defined between sections 7a and 7b contains a packing of radiation-absorbing bodies, for example, lead balls as described earlier. The inner region of section 7a is completely filled with similar bodies or balls. Of course, there are again provided retaining means 6a and 6b for respectively holding the leaden balls or bodies 5 in sections 7a and 7b.

FIG. 4 illustrates a further embodiment for running a twin pipe system from an uncontaminated area into the contaminated room and vice versa. In this system there are shown two walls being first passed through by an inner pipe 14a having a helical portion 9 situated in the inner space as defined between the two walls 2. The helix 9 is surrounded by a tubular mantle or sleeve 8 of radiation-absorbing material, and the interior of this mantle 8 communicates with the outer pipe line 14b.

In this embodiment only the interior of mantle 8 is filled with lead balls or the like, and the helix 9 is embedded in this packing. The mantle 8 may be composed of a lead band wound around a tubular supporting member constituting the actual outer pipe. This is of particular advantage, since no prefabrication of the mantle is required but one can make the mantle 8 as appropriate under the respective circumstances in simply winding such lead tape around the support as often as deemed necessary. It should be mentioned that the inner diameter of the tubular space defined by mantle 8 is larger by approximately one order of magnitude than the inner diameter of pipe line 14a.

In certain instances it may be necessary to thermally insulate the pipe line or pipe line system running through the wall 2 as previously described. This is particularly necessary if the pipe line serves as passageway for a fluid heat-exchanging medium. In such a case it is of advantage not to embed the pipe line directly in the protective wall 2 but to first insert a heat-insulating filling into the wall and then to embed the pipe line in that heat insulating filling.

Since the heat-insulating filling will not normally by itself provide protection against radiation, it is of advantage to further embed in the heat-insulating filling, nuclear-radiation-absorbing bodies and elements surrounding the pipe line but without touching each other. This latter condition is not a very strict one, but one should prevent the nuclear-radiation-absorbing packing from forming a heat bridge thus in ineffectuating the insulation; lead is a good heat conductor.

FIG. 5 illustrates an example of such an arrangement. There is inserted into the wall 2 a heat insulator or insulating filling 10 through which is passed again the twin pipe system comprised of a pipe line 14a with a helix 9 and an outer pipe line 4b with an enlarged section 7b containing the helix 9 as aforedescribed.

The central area of the pipe system and particularly the section 7b is surrounded by radiation-absorbing bodies 5b such as lead balls which are individually embedded in heat insulator 10 whereby each or most balls are completely surrounded by heat insulating material. In other words these balls 5b do not touch each other and no heat bridge is formed. Some balls may engage the outer wall of section 7b, but they will not usually be in contact with other balls.

Inside of section 7b of pipe 4b there are again filling bodies 5 and the helix 9 is embedded therein.

If in the alternative the wall 2 is considerably thinner than that shown in FIG. 5, the exposed portions of heat insulator 10 are preferably enveloped by a radiation-absorbing member (e.g. a mantle 8).

Figure 6:
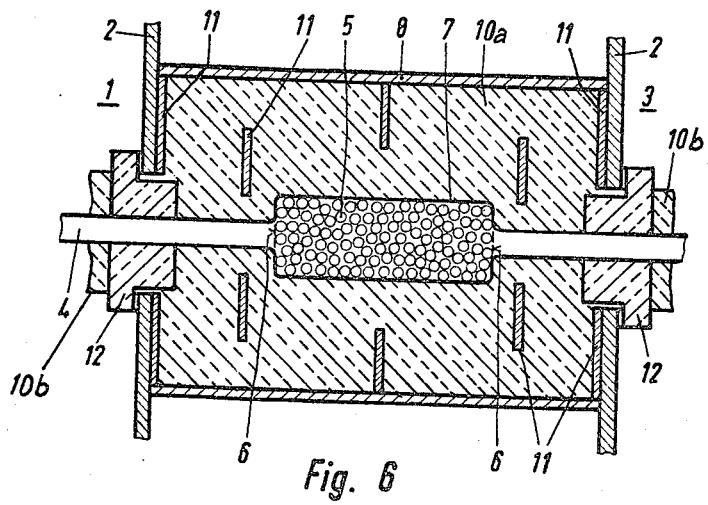
FIG. 6 illustrates a modification of the device shown in FIG. 5.

FIG. 6 illustrates an embodiment of the invention comparable to some extent to that shown in FIG. 4 because there are again shown two spaced-apart walls 2. For reason of simplification only a single pipe line 4 with enlarged section 7 is shown in FIG. 6, but, of course, any of the twin-pipe systems shown in the preceding figures can be used.

The two walls 2 are interconnected by a cylindrical heat insulating member 10a enveloped by a radiation-absorbing tubular member 18. Each of the walls 2 is presumed to be strongly radiation absorbing. The section 7 again is filled with leaden balls or the like 5. The heat insulator 10a surrounds section 7 completely and has embedded therein ring shaped diaphragm-like members 11 made of strongly radiation-absorbent material such as lead. Members 11 are concentric with pipe 4.

The pipe 4 is not directly passed through the walls 2, but at each wall there are interposed annular heat-insulating bodies 12, respectively, defining gas-tight seals between pipe and wall. It can be seen from the drawing that the pipe 4 is embedded in a heat-insulating mantle 10b in room 1 as well as in area 3.

In lieu of the annular members 11 one can also embed in the heat insulator 10a, radiation-absorbing tapes or wires.

The invention is not limited to the embodiments described above but all changes and modifications thereof not constituting departments from the spirit and scope of the invention are intended to be covered by the following claims:

I claim:

1. A system for conducting fluid between a first area contaminated with nuclear radiation and a second area to be maintained free of radiation comprising, in combination with a wall of a material adapted to absorb said radiation and disposed between said areas, a first tubular member extending through said wall and opening on opposite sides thereof for the conduction of fluid between said areas; fluid-permeable means axially spaced along said first member in the region of said wall for defining an enlongated compartment in said first member extending over at least a substantial fraction of the thickness of said wall; a second tubular member extending through said first tubular member with all-around clearance and opening on opposite sides of said wall for conducting fluid between said areas, said second member being provided with means forming a tortuous path for the fluid conducted therethrough, thereby impeding transmission of radiation through said second member; and a fluid-permeable packing of non-coherent discrete nuclear-radiation-absorbent bodies completely filling said compartment in the clearance between said second tubular member and said first tubular member and forming between them a multiplicity of small tortuous channels extending through said compartment.

2. A system for conducting fluid between a first area contaminated with nuclear radiation and a second area to be maintained free of radiation comprising, in combination with a wall of a material adapted to absorb said radiation and disposed between said areas, a cylindrical first tubular member extending through said wall and opening on opposite sides thereof for the conduction of fluid between said areas; fluid-permeable means axially spaced along said first member in the region of said wall for defining an elongated compartment in said first member extending over at least a substantial fraction of the thickness of said wall; a second tubular member extending generally centrally through said first tubular member with all-around clearance and opening on opposite sides of said wall for conducting fluid between said areas, said second member having a multi-turn helicoidal portion within said compartment; and a fluid-permeable packing of noncoherent discrete nuclear-radiation-absorbent bodies completely filling said compartment around said portion in the clearance between said second tubular member and said first tubular member and forming between them a multiplicity of small tortuous channels extending through said compartment.

3. A system for conducting fluid between a first area contaminated with nuclear radiation and a second area to be maintained free of radiation comprising, in combination with a wall of a material adapted to absorb said radiation and disposed between said areas, a first tubular member extending through said wall and opening on opposite sides thereof for the conduction of fluid between said areas; fluid-permeable means axially spaced along said first member in the region of said wall for defining an elongated compartment in said first member extending over at least a substantial fraction of the thickness of said wall, an elongated mass of thermally insulating material in said wall surrounding said first member at least in the region of said compartment and provided with a multiplicity of multispaced radiation-absorbent bodies distributed within said mass; a second tubular member extending through said first tubular member with all-around clearance and opening on opposite sides of said wall for conducting fluid between said areas, said second member being provided with means forming a tortuous path for the fluid conducted therethrough, thereby impeding transmission of radiation through said second member; and a fluid-permeable packing of noncoherent discrete nuclear-radiation-absorbent bodies completely filling said compartment in the clearance between said second tubular member and said first tubular member and forming between them a multiplicity of small tortuous channels extending through said compartment.

4. A system for conducting fluid between a first area contaminated with nuclear radiation and a second area to be maintained free of radiation comprising, in combination with a wall of a material adapted to absorb said radiation and disposed between said areas, a cylindrical first tubular member extending through said wall and opening on opposite sides thereof for the conduction of fluid between said areas; fluid-permeable means axially spaced along said first member in the region of said wall for defining an elongated compartment in said first member extending over at least a substantial fraction of the thickness of said wall; an elongated mass of thermally insulating material in said wall surrounding said first member at least in the region of said compartment and provided with a multiplicity of multispaced radiation-absorbent bodies distributed within said mass; a second tubular member extending through said first tubular member with all-around clearance and opening on opposite sides of said wall for conducting fluid between said areas, said second member having a multi-turn helicoidal portion within said compartment; and a fluid-permeable packing of noncoherent discrete nuclear-radiation-absorbent bodies completely filling said compartment around said portion in the clearance between said second tubular member and said first tubular member and forming between them a multiplicity of small tortuous channels extending through said compartment.

References Cited by the Examiner
UNITED STATES PATENTS

| | | | |
|---|---|---|---|
| 1,609,682 | 12/1926 | Angeband | 250—108 |
| 2,448,315 | 8/1948 | Kunzog | 62—511 |
| 2,675,485 | 4/1954 | Scag | 250—108 |
| 2,716,705 | 8/1955 | Zinn | 250—108 |
| 2,853,624 | 9/1958 | Wigner | 250—108 |

RALPH G. NILSON, *Primary Examiner.*

JAMES W. LAWRENCE, *Examiner.*